United States Patent [19]

Battey et al.

[11] Patent Number: 5,442,439
[45] Date of Patent: Aug. 15, 1995

[54] SPECTROGRAPH WITH MULTIPLEXING OF DIFFERENT WAVELENGTH REGIONS ONTO A SINGLE OPTO-ELECTRIC DETECTOR ARRAY

[75] Inventors: David E. Battey; Harry Owen, both of Ann Arbor; James M. Tedesco, Livonia, all of Mich.

[73] Assignee: Kaiser Optical Systems, Inc., Ann Arbor, Mich.

[21] Appl. No.: 50,862

[22] Filed: Apr. 21, 1993

[51] Int. Cl.6 .............................................. G01J 3/28
[52] U.S. Cl. .................................................. 356/328
[58] Field of Search ............... 356/326, 328, 330-334, 356/310

[56] References Cited

U.S. PATENT DOCUMENTS

| | | |
|---|---|---|
| 3,578,845 | 5/1971 | Brooks et al. |
| 4,729,658 | 3/1988 | Poultney ............... 356/328 |
| 5,011,284 | 4/1991 | Tedesco et al. ....... 356/301 |
| 5,042,893 | 8/1991 | Ong ....................... 356/328 |

OTHER PUBLICATIONS

Lerner et al, "Direct Reading Spectrometer Optimization Using Two Complementary Concave Holographic Gratings", SPIE, vol. 503 1984 pp. 53-58.
Sweedler et al, "High ... Detectors," Analytical Chemistry, vol. 60, No. 4, Feb. 15, 1988 pp. 282-292.
Kaiser Optical Systems, Inc. Brochure "HoloSpec f/1.8i" VPT System.

Primary Examiner—Vincent P. McGraw
Assistant Examiner—K. P. Hantis
Attorney, Agent, or Firm—Gifford, Krass

[57] ABSTRACT

An optical spectrograph utilizes a plurality of holographic transmission optical gratings operative to receive an incoming source of light to be analyzed and diffract the light such that different spectral components impinge upon spatially separated regions of an opto-electronic detector. Various grating configurations are disclosed, including a physical stack of gratings conducive to extreme compactness, as well as a spaced-apart configuration used to preclude spectral cross talk in certain configurations. Diverging light emerging from a fiber-optic bundle is collimated by a first lens assembly prior to passing through the gratings, and a second lens assembly is used to focus the diffracted light onto the detectors, preferably in the form of a two-dimensional CCD array.

17 Claims, 5 Drawing Sheets

FIG - 1
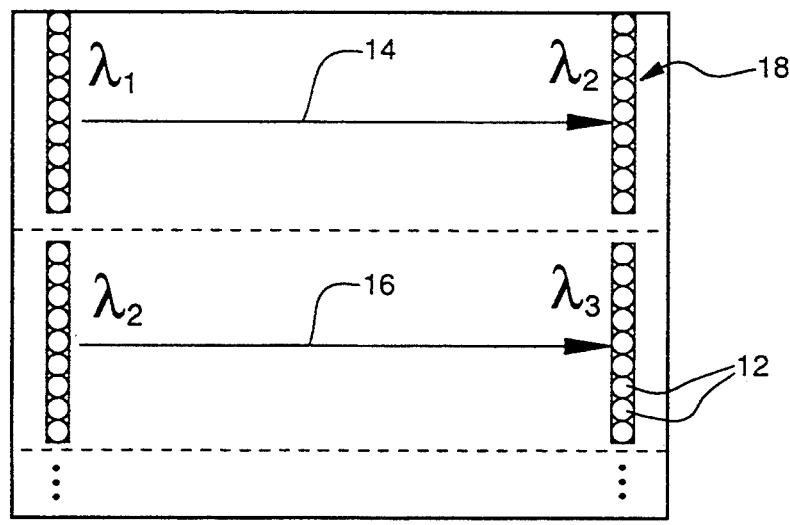
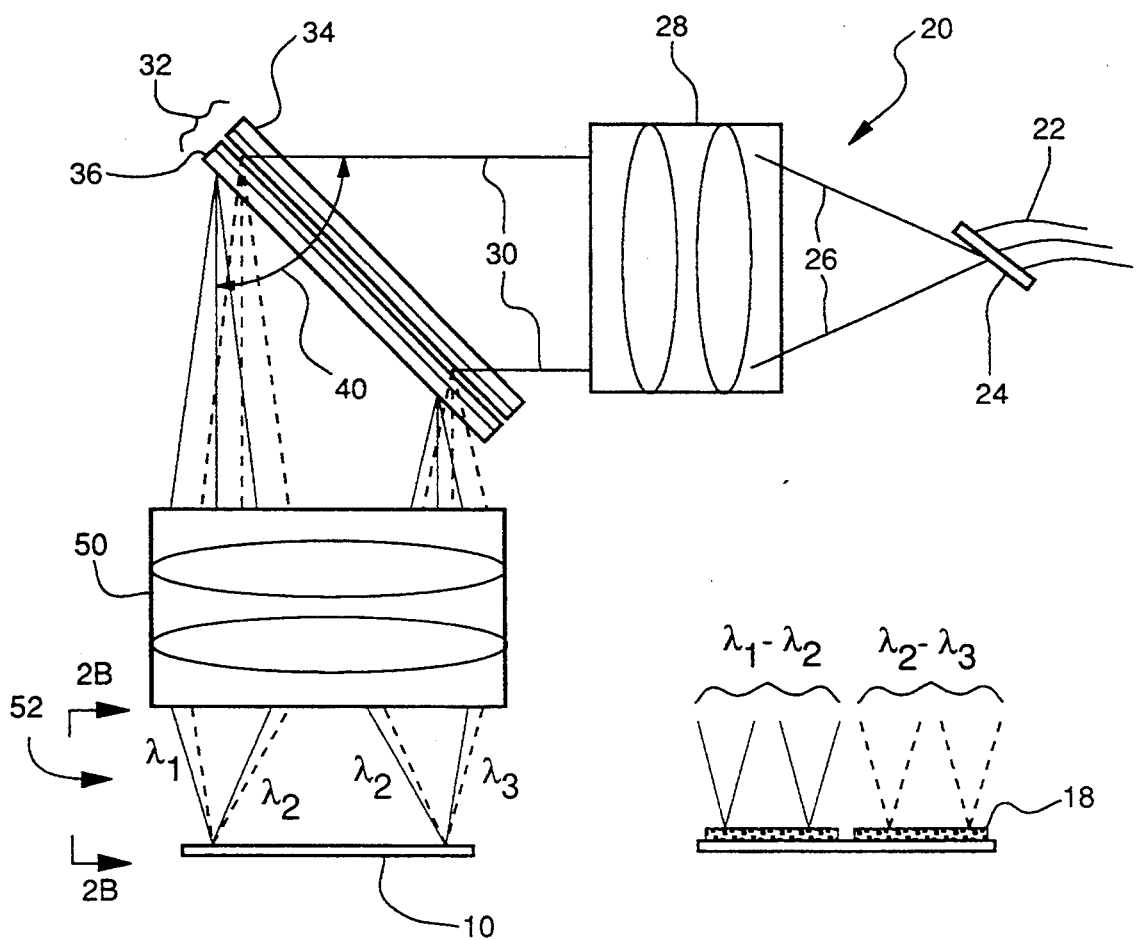
FIG - 2
FIG - 2A

SPECTROGRAPH WITH MULTIPLEXING OF DIFFERENT WAVELENGTH REGIONS ONTO A SINGLE OPTO-ELECTRIC DETECTOR ARRAY

FIELD OF THE INVENTION

This invention relates generally to methods and apparatus applicable to spectroscopy and, in particular, to a spectrograph configuration wherein different wavelength regions are multiplexed such that they impinge onto a single detector array in spatially separate areas.

BACKGROUND OF THE INVENTION

A spectrograph is a device for recording the spectral composition of light emerging from an entrance aperture, such as a slit. A simple, prior-art spectrograph configuration uses a conventional Czerny-Turner monochromator consisting of a planar reflection grating and a pair of concave spherical mirrors. Radiation emerging from the entrance slit is collimated by the first mirror, and the collimated light is chromatically dispersed by the grating to separate the color content along different angles. The second mirror then focuses these angularly dispersed colors into spatially separated images, and an exit slit passes only a small color range for measurement by a single detector channel. Data may be gathered over an extended spectral range by rotating the grating, which causes different color regions of the spectrally dispersed image to coincide with the exit slit.

Spectrograph configurations based upon the Czerny-Turner monochromator are slow due to the serial nature of the spectral data acquisition. Speed limitations are further pronounced in applications such as Raman spectroscopy, where weak signal levels require long integration times for each spectral data point on a photon-counting detector.

Recent advances have resulted in improvements to both spectrum acquisition time and the signal-to-noise ratio in spectrographic instruments. For example, spectral data may be acquired in parallel on a two-dimensional detector, which replaces the exit slit, thus allowing the grating to remain fixed while the detector array is illuminated by an extended spectral range from the monochromator. The grating may then be stepped to another position or replaced with a different grating to acquire data in a different spectral range.

If a simple entrance slit is being imaged onto a CCD detector, the detector signals may be added or binned in the constant color direction directly on the detector device, thus enhancing sensitivity and signal-to-noise ratio. If increased spatial resolution is also required; for instance, if the entrance slit is replaced by an array of optical fibers from different light sources, then a modified imaging Czerny-Turner monochromator may be constructed in conjunction with a 2-D image sensor by replacing the spherical mirrors with toroidal mirrors to correct for astigmatism. Another recent development in spectrograph technology is the use of volume holographic transmission gratings in place of the more conventional surface relief reflection gratings of both the ruled and holographic type. Such volume gratings can be used with on-axis transmission lenses as imaging elements in place of the reflective mirrors, resulting in an efficient system and a very compact package as evident by U.S. Pat. No. 5,011,284, assigned to the assignee of the present invention. Volume gratings are also capable of very high dispersion, enhancing the spectral resolution for a given focal length and image size.

While the use of a detector array in place of an exit slit enhances spectrographic performance and reliability, the use of a rotatable grating, grating turret, or any moving component remains a serious drawback. Thus, even with recent advances in the prior art, there remains an unsatisfied need for a compact and efficient spectrographic instrument wherein a two-dimensional detector array may be employed for both high spectral resolution and a large spectral bandwidth without the need for moving parts.

SUMMARY OF THE INVENTION

The present invention builds upon previous spectrographic concepts and solves prior art limitations through the use of holographic transmission gratings and a two-dimensional detector array which, in combination, extend spectral range and/or resolution. The preferred embodiment utilizes a plurality of holographic transmission optical gratings, each having a different line spacing to disperse a particular portion of the spectrum, and means for directing a portion of the light to be analyzed onto each grating so as to diffract at least a portion of the incident light onto a spatially separate region of the detector, so that different areas of the detector receive signals representative of different portions of the spectrum encompassed in the incoming beam. In the preferred embodiment, the invention configures the gratings as a stacked structure, each grating exhibiting a diffraction path tilted slightly with respect to the paths of the other gratings, enabling wavelength bands representative of the incoming radiation to impinge upon the detector as adjacent or stacked striped regions.

In an alternative embodiment, the gratings are not stacked but are parallel and spaced apart so that light diffracted by one grating is not attenuated by a subsequent grating, thereby minimizing any potential cross talk problems. This alternative configuration may also be constructed in a more modular fashion, allowing different combinations of "drop-in" gratings to be more expressly changed than would be possible with a fixed sandwich-like structure.

In both embodiments the tilting of the diffraction paths may be derived by either recording a tilt angle in the fabrication of the gratings or by physically tilting the gratings with respect to one another.

In addition to the plurality of gratings, a lens assembly is used to collimate the incident light prior to dispersion by the holographic gratings, and a second lens assembly is used to focus the spectrally and spatially separated light onto the detector array, preferably a two-dimensional CCD. In the alternative embodiment utilizing spaced apart gratings, the focusing lens requires an enlarged input aperture since the various gratings are accessing different regions of the collimated input beam.

BRIEF DESCRIPTION OF THE DRAWINGS

FIG. 1 is a preferred layout of wavelength regions across the surface of a CCD detector;

FIG. 2 is a drawing of a spectrograph formed in accordance with the present invention wherein two transmission holographic gratings are physically stacked;

DETAILED DESCRIPTION OF THE PREFERRED EMBODIMENT

Figure 3A:
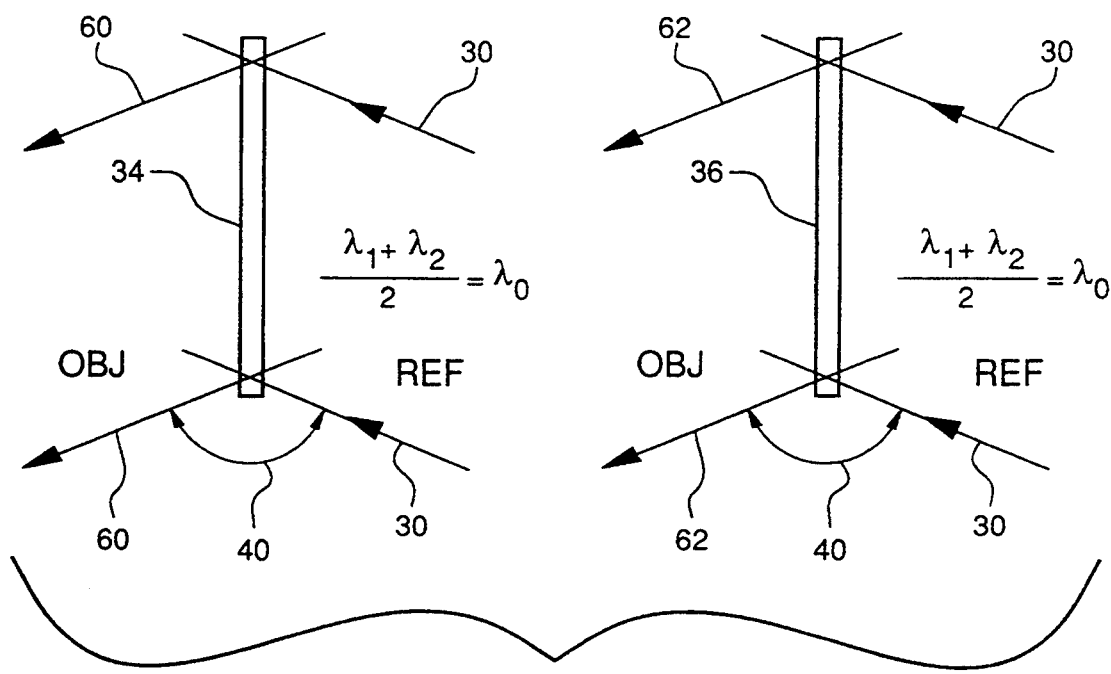
FIG. 3a is a top view of two holographic gratings useful in the present invention which exhibit fold angles of approximately 90°.

Referring to FIG. 1, there is shown a portion of the surface of an image detector having a plurality of opto-electric detectors 12, in the preferred case this sensor being a charge-coupled device (CCD) and with the opto-electric elements being the pixels of the CCD. Alternatively, the detector could be a charge injection device (CID), intensified diode array, or any two-dimensional array detector. Two regions of the incoming optical radiation to be analyzed impinge upon the surface of the CCD, the first wavelength region 14 spanning wavelength $\lambda_1$ to $\lambda_2$, and the second wavelength region 16 beginning with wavelength $\lambda_2$ and spanning to $\lambda_3$. The vertical slices 18 making up each wavelength region represent the monochromatic images of the light emerging from the entrance aperture, in the preferred embodiment this being a stack of optical fibers carrying radiation that was scattered by a sample or samples of interest located remotely from the apparatus of the present invention.

While FIG. 1 shows two wavelength regions stacked such that their longitudinal sides are adjacent, it should be noted that other placements of the wavelength regions onto the detector array are possible, and that the number of such regions is limited only by the resolution desired; that is, the number of pixels dedicated to each wavelength region, and, of course, the total number of opto-electronic detectors available in the detector array.

FIG. 2 shows a top view of a preferred configuration of the components which comprise the spectrograph of the present invention, those components being indicated generally at 20. Light scattered by a remote sample is in this case carried along fiber bundle 22, where it emerges at a surface 24 formed at the end of the bundle and illuminates, as indicated by diverging lines 26, a first lens assembly 28, which collimates the incoming radiation as indicated by substantially parallel lines 30. The collimated light impinges upon a plurality of stacked holographic transmissive optical gratings indicated generally at 32, with the light first striking a grating 34 associated with the first wavelength region 14 depicted in FIG. 1, spanning wavelengths $\lambda_1$ to $\lambda_2$.

Grating 34 diffracts the portion of incident light 30 that lies in the wavelength region $\lambda_1$ to $\lambda_2$ through an angle of approximately 90°. Incident light outside the wavelength region $\lambda_1$ to $\lambda_2$ is transmitted with little or no diffraction by grating 34. Both diffracted and transmitted portions of the light leave grating 34 and are immediately incident to a second grating 36, which is associated with the second wavelength region 16 depicted in FIG. 1, spanning wavelengths $\lambda_2$ to $\lambda_3$. The light diffracted by grating 34 is outside the wavelength region of grating 36, and is therefore transmitted with little or no diffraction by grating 36. Light within the wavelength region $\lambda_2$ to $\lambda_3$ that was transmitted by grating 34, on the other hand, is diffracted by grating 36 through an angle of approximately 90°.

In this preferred configuration, each grating performs two angular redirections of the incoming radiation, the first of these redirections being depicted by a fold angle 40 which, in this case, is approximately 90° in the case of both gratings. Each grating also performs a redirection represented by a tilt angle which may be thought of as coming out of the page in the case of the first wavelength region and into the page in the case of the second wavelength region. This critical concept will become increasingly understood through subsequent discussions in conjunction with other figures.

The incoming radiation, having been spectrally separated into wavelength regions, passes through a second lens assembly 50, which is operative to focus the wavelength regions into spatially separate areas on the detector device 10. As the view provided in FIG. 2 is a top view, the spatially separated wavelength regions are stacked into the page of the drawing, an arrangement which is evident by the side view 52 represented by A—A in the figure.

Turning now to FIG. 3, FIG. 3a is a top view depicting the path of the collimated incoming radiation, depicted by lines 30 as it passes through grating 34 on the left responsible for the first wavelength section, and grating 36 on the right responsible for the second wavelength section. The angle 40 formed by the incoming radiation and the radiation after being diffracted by gratings 34 and 36, as represented with lines 60 and 62, is the fold angle introduced in FIG. 2. As mentioned, in the preferred embodiment, this angle is approximately 90°, but may alternatively, in fact, be any angle above or below to 90°; that is to say, the light may pass through the gratings and be redirected only in terms of the tilt required to position different wavelength regions onto different areas of the image sensor and the dispersion required to spread each wavelength range across the extent of the array and still be in keeping with the present invention. Moreover, although the fold angles for the two gratings shown are substantially equal, the fold angle for each grating may, in fact, be different. Additionally, while the gratings are shown in air, they may be placed in glass or any medium exhibiting a desirable index of refraction in accordance with the application at hand. In summary, the fold angle for each grating and the medium index associated with the gratings may be chosen in the context of the overall system design, including consideration of focal length, fiber size, CCD dimensions, desired band widths, and so on.

Another significant consideration is polarization. The 90° fold with the grating in glass will not efficiently diffract P-polarized light, though a CCD-based spectrograph should not need or want that much dispersion. A lesser fold angle in glass, or a fold in air as shown, provides significant P-polarized throughput.

Figure 3B:
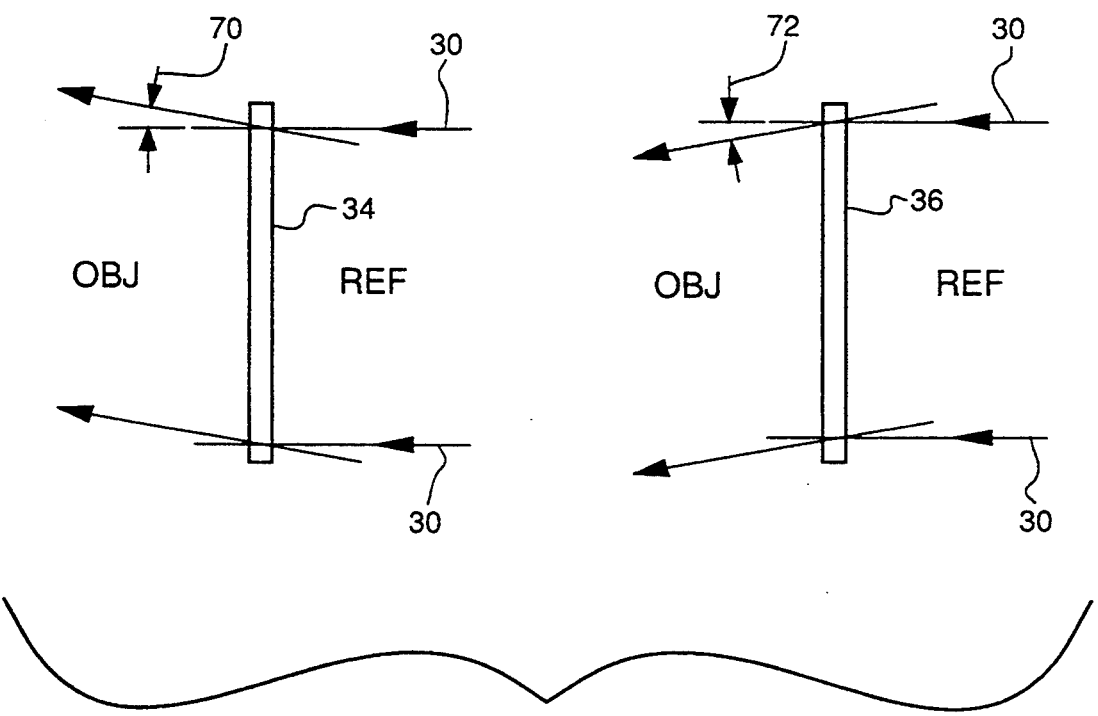
FIG. 3b is a side view of the gratings of FIG. 3a illustrating their different tilt angles.

Turning now to FIG. 3b, a side view of gratings 34 and 36 illustrates the tilt angles which are indicated by numerals 70 and 72 respectively. In this preferred arrangement, incoming radiation depicted by lines 30 is tilted slightly upwardly in the figure at angle 70 by element 34, whereas the incoming radiation associated with the second wavelength section is tilted slightly downward at angle 72 by element 36. In this case, the tilt angles are roughly similar and symmetrical about the central axis of the incoming radiation; however, various tilt angles are possible, including multiple tilt angles to either side which, in fact, would be necessary if more than two gratings are used.

Figure 4A:
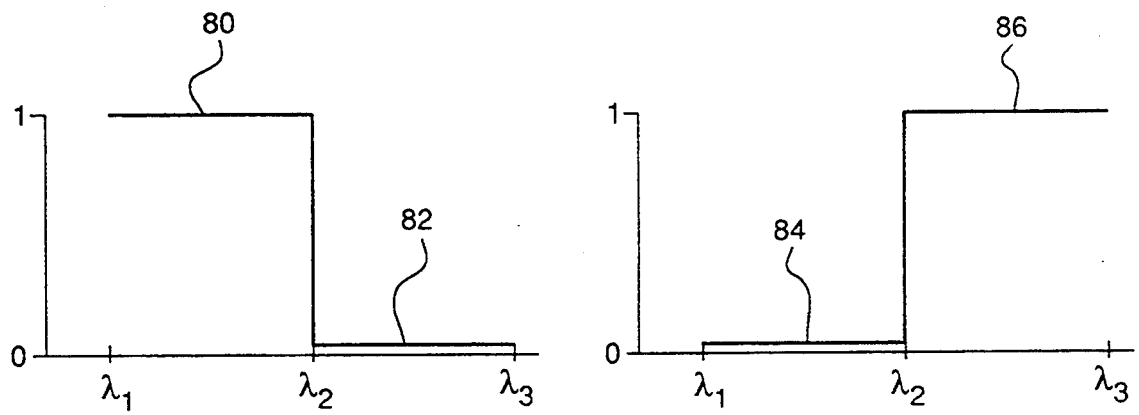
FIG. 4a shows the diffraction efficiency of two ideal gratings useful with the present invention.
Figure 4B:
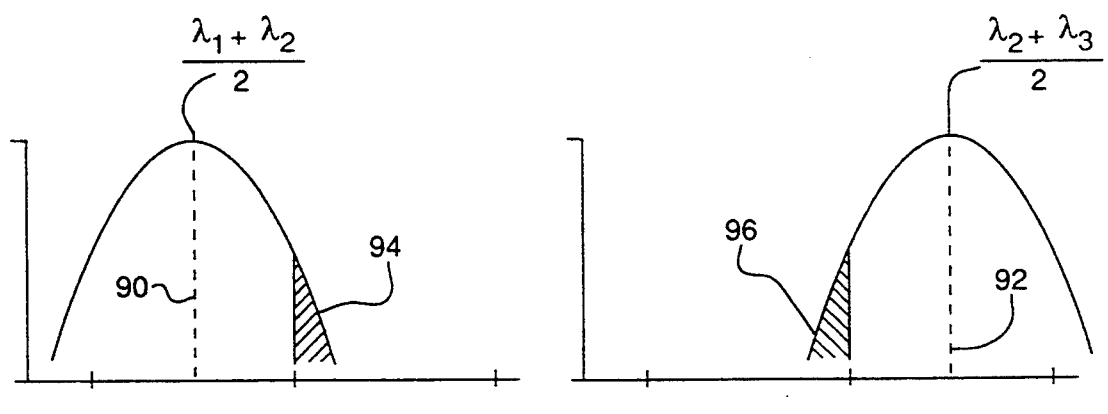
FIG. 4b illustrates curves showing the practical diffraction efficiency of two gratings useful in the present invention.

FIG. 4 illustrates the diffraction efficiency of two gratings useful in the preferred embodiment of the apparatus. In FIG. 4a, an ideal diffraction efficiency is depicted, wherein the grating associated with the first wavelength section diffracts the entire band of wavelengths from $\lambda 1$ to $\lambda 2$ as shown by line 80, yet transmits virtually unaffected the second wavelength section comprising wavelengths $\lambda 2$ to $\lambda 3$, as indicated with line 82 being nearly zero. In contrast, the second grating, shown on the right side of FIG. 4a, performs oppositely to that of the first grating by transmitting unaffected the first wavelength section as indicated by the near-zero line of 84 yet diffracting all wavelengths from $\lambda 2$ to $\lambda 3$ as indicated with the line 86. The practical version is better represented by the curves of FIG. 4b, wherein the greatest diffraction efficiency for a particular band is about $(\lambda 1 + \lambda 2)/2$ for the first grating and $(\lambda 2 + \lambda 3)/2$ for the second grating, these average values being shown by broken lines 90 and 92 respectively. In addition, with real-world elements there will be some overlap between gratings as shown by the hashed regions 94 and 96.

Figure 5A:
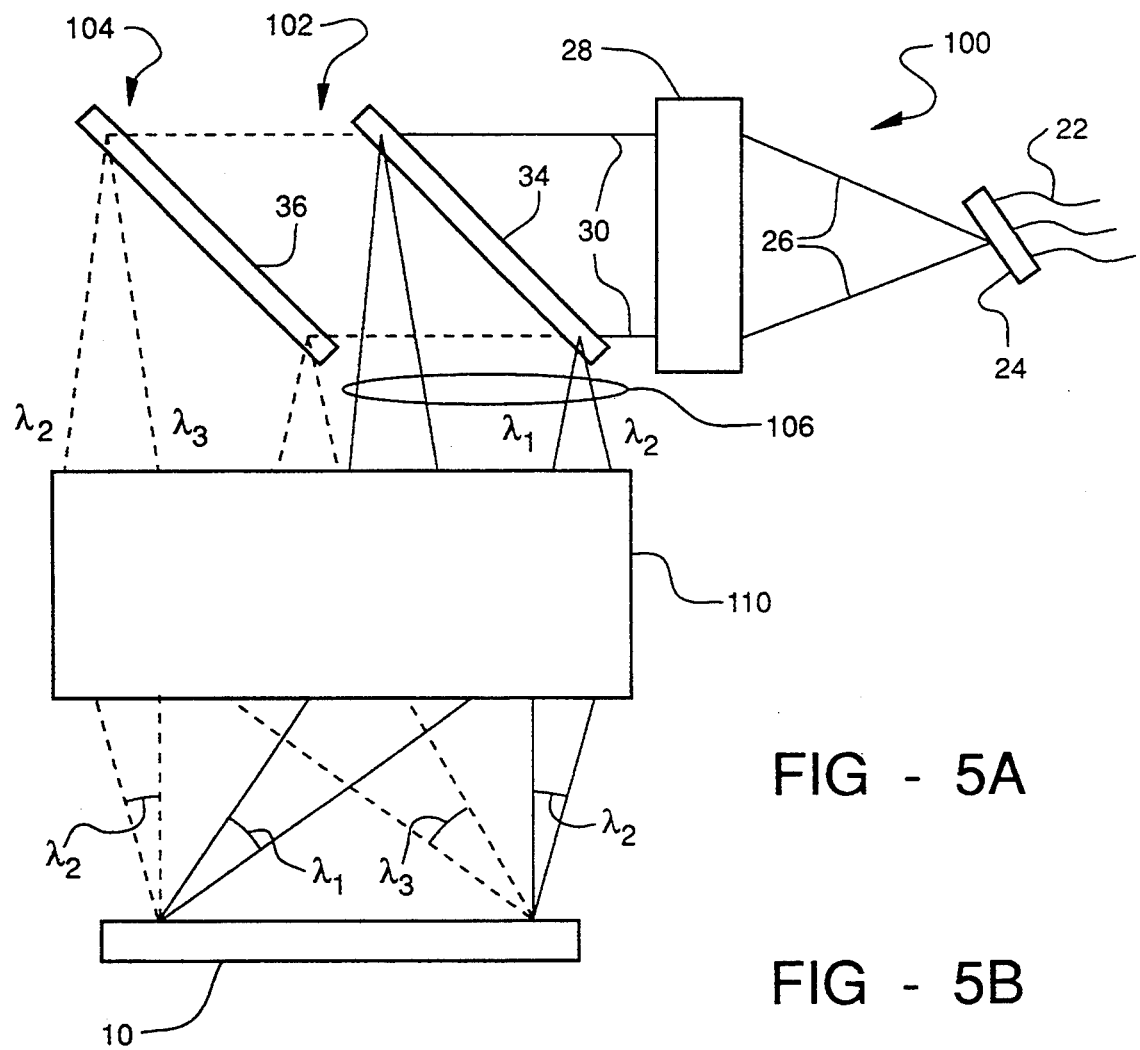
FIG. 5 is a drawing of an alternative embodiment of the present invention wherein two gratings are parallel but spaced apart such that light diffracted by grating 1 is not affected by a subsequent pass through grating 2.
Figure 5B:
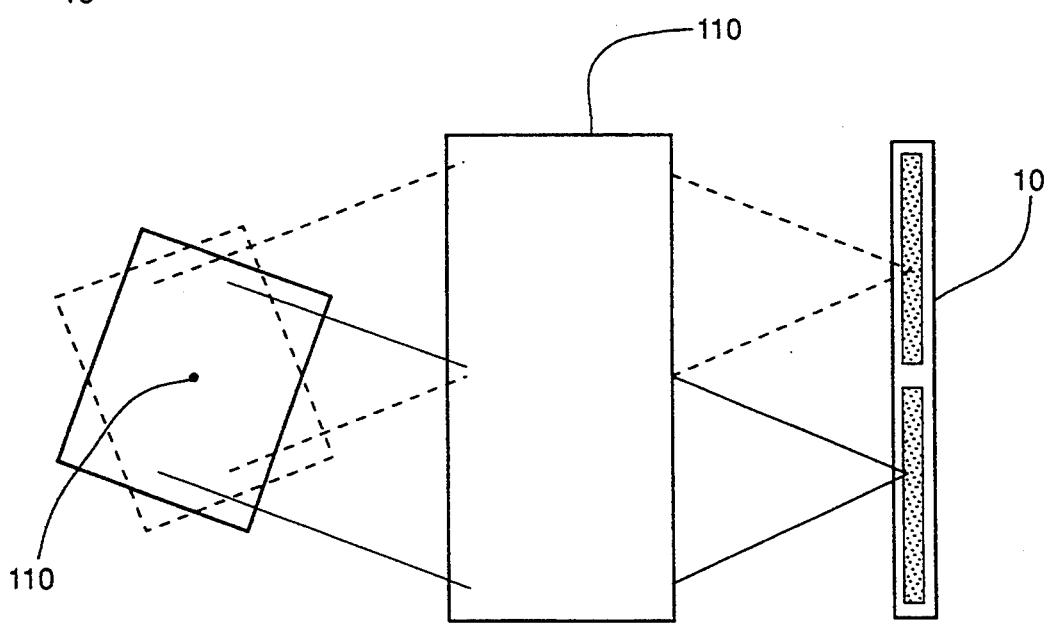

Turning now to FIG. 5, an alternative configuration of the present invention is depicted generally at 100, wherein the gratings are not physically stacked as in FIG. 2 but are spaced apart at positions 102 and 104, respectively. As in the preferred embodiment, incoming light 26 diverging from surface 24 of fiber 22 passes through a first lens assembly 28 as collimated light depicted by lines 30, and passes through a first grating 34 and a second grating 36. In this case, however, since the second grating is physically spaced apart from the first grating, the light diffracted by the first grating, as indicated generally by lines 106, does not pass through the second grating and is thus not affected thereby. This configuration thus eliminates cross talk problems that may be presented by physically stacking the gratings, and may allow a more modular configuration, facilitating different combinations of "drop-in" gratings to be more easily utilized and exchanged. Moreover, as shown in the side view, the tilt angle need not be recorded in the grating; instead, the gratings may be physically rotated to provide the tilt required to direct different wavelength sections onto different areas of the image sensor. This concept may be extended by having each grating rotated relative to the other gratings by angle 110 shown in the side view. This alternative configuration does present two potential drawbacks, however, the first being that it is less compact than the arrangement possible with stacked gratings, the second being the need for a second lens element 110 having twice the aperture or speed of the lens element in the stacked-grating configuration, since in this case each grating is accessing a different portion of the lens aperture.

Figure 6:
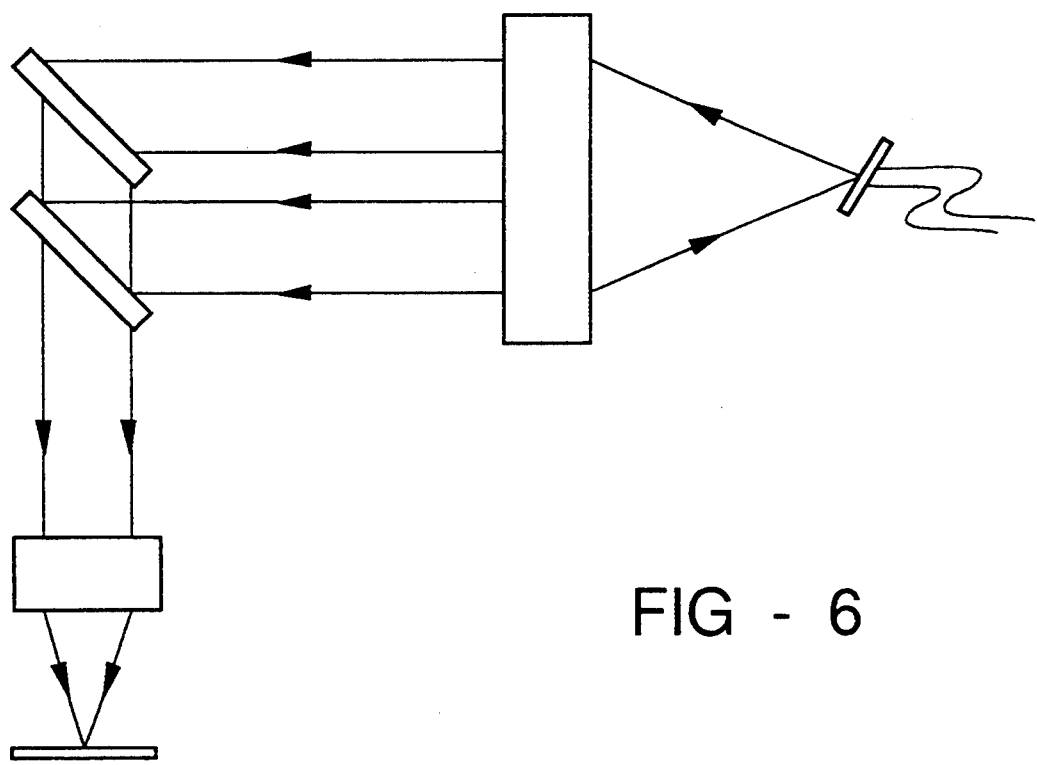
FIG. 6 is a drawing of the second alternative embodiment of the present invention utilizing a multiplexed input aperture.
Figure 7:
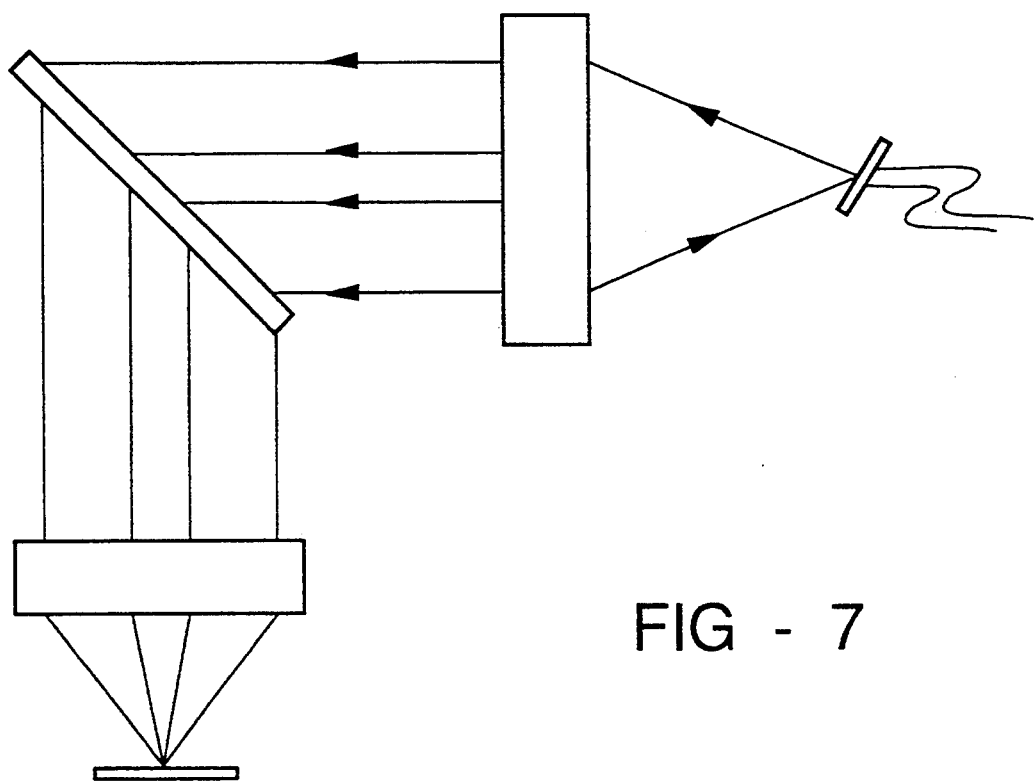
FIG. 7 is yet another alternative embodiment of the present invention wherein adjacent gratings are planarly formed onto a single substrate.

FIGS. 6 and 7 show two more alternative embodiments of the present invention. FIG. 6 uses a multiplexed input aperture, and arranges the two gratings such that the spectral band associated with each uses only one half of the available input aperture. In FIG. 7, adjacent gratings are formed on a single substrate in conjunction with a faster input aperture. While an advantage of this configuration is the complete elimination of cross talk, either faster collimating and focusing lenses are both required, or the system will effectively operate at a lower numerical aperture.

We claim:

1. An optical spectrograph for use in analyzing an incoming light beam, comprising:
   a two-dimensional opto-electric array containing rows and columns of detector elements;
   a plurality of holographic transmission optical gratings, each recorded to diffract a predetermined range of wavelengths, said gratings being supported so that a light beam to be analyzed passes through each, with each grating diffracting wavelengths in its range onto said two-dimensional array of opto-electric detectors in such a way that the light diffracted by each grating falls onto a different set of detector elements comprising said array.

2. The spectrograph of claim 1 wherein the light diffracted by each grating falls onto a different row of said array.

3. The spectrograph of claim 1 wherein the recording of a particular grating alone causes the light diffracted by that grating to fall onto a particular set of detector elements comprising said array.

4. The spectrograph of claim 1 wherein the recording of a particular grating together with its physical orientation cause the light diffracted by that grating to fall onto a particular set of detector elements comprising said array.

5. The optical spectrograph of claim 1 wherein said gratings are substantially planar and stacked parallel to one another.

6. The optical spectrograph of claim 1 wherein said gratings are spaced apart such that light diffracted by each grating is re-directed so as not to pass through subsequent gratings.

7. The optical spectrograph of claim 1 where said opto-electric detector comprises a charge-coupled device.

8. The optical spectrograph of claim 1 wherein said incoming light beam is carried by an optical fiber.

9. The optical spectrograph of claim 1 further including means to collimate said incoming light beam.

10. The optical spectrograph of claim 1, further including means to focus the light diffracted by said gratings onto said detector elements.

11. In an optical spectrograph of the type including a holographic transmission optical grating operative to diffract light to be analyzed onto an opto-electric detector the improvement comprising:
    a detector in the form of a two-dimensional image sensor; and
    a plurality of said gratings, each having a different line spacing and each exposed to the same cross section of the light to be analyzed, and
    means to direct the light diffracted by each grating onto a different surface area of said sensor.

12. An optical spectrograph comprising:
    a source of light to be analyzed, the light passing through a plurality of holographic transmission optical gratings, each grating being operative to diffract the light received at a different angle relative to the other gratings;

a two-dimensional image sensor;

means for directing the light diffracted by each grating onto the surface of said sensor, whereby signals representative of different portions of the spectrum encompassed in the incoming beam impinge said sensor in different areas.

13. The optical spectrograph of claim 12 wherein the spectrum encompassed in the incoming beam impinges upon said sensor as a series of separate bands.

14. A method of separating optical radiation into spectral components comprising the steps of:

providing a source of optical radiation to be analyzed;

passing the optical radiation through a plurality of holographic transmission optical gratings, each grating diffracting a portion of the optical radiation with a different line spacing; and focussing the diffracted light onto a planar image sensor so that the radiation diffracted by each grating falls on a different area of the sensor.

15. A method of separating optical radiation into spectral components comprising the steps of:

providing a source of optical radiation to be analyzed;

passing the radiation through a plurality of holographic transmission optical gratings each diffracting the radiation with a different line spacing and orientation; and focusing the diffracted light onto a planar image sensor with the gratings configured so that the radiation from each grating falls on a different area of the sensor.

16. The method of claim 15 wherein the gratings are planar and supported parallel to one another.

17. The method of claim 16 wherein said gratings are oriented angularly with respect to one another so that the radiation from each grating falls on a different area of said sensor.

* * * * *